Feb. 18, 1964　　　　　J. V. COWAN　　　　　3,121,324
ULTRASONIC INSPECTION APPARATUS
Filed Jan. 11, 1961　　　　　　　　　　　　4 Sheets-Sheet 1

INVENTOR
JOHN V. COWAN
BY
ROBERT HOCKFIELD
ATTORNEY.

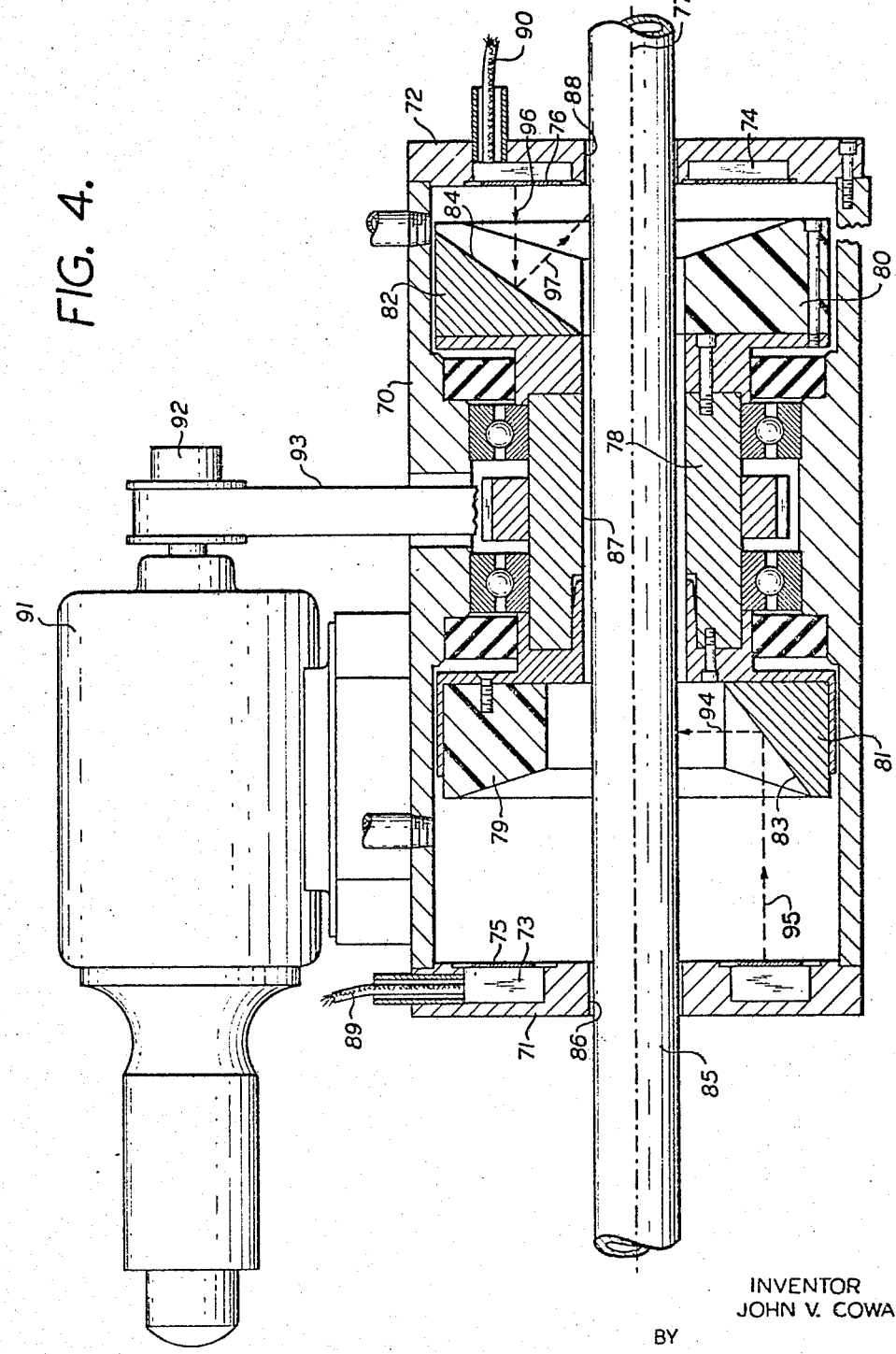

INVENTOR
JOHN V. COWAN

BY
ROBERT HOCKFIELD
ATTORNEY.

Feb. 18, 1964 J. V. COWAN 3,121,324
ULTRASONIC INSPECTION APPARATUS
Filed Jan. 11, 1961 4 Sheets-Sheet 4
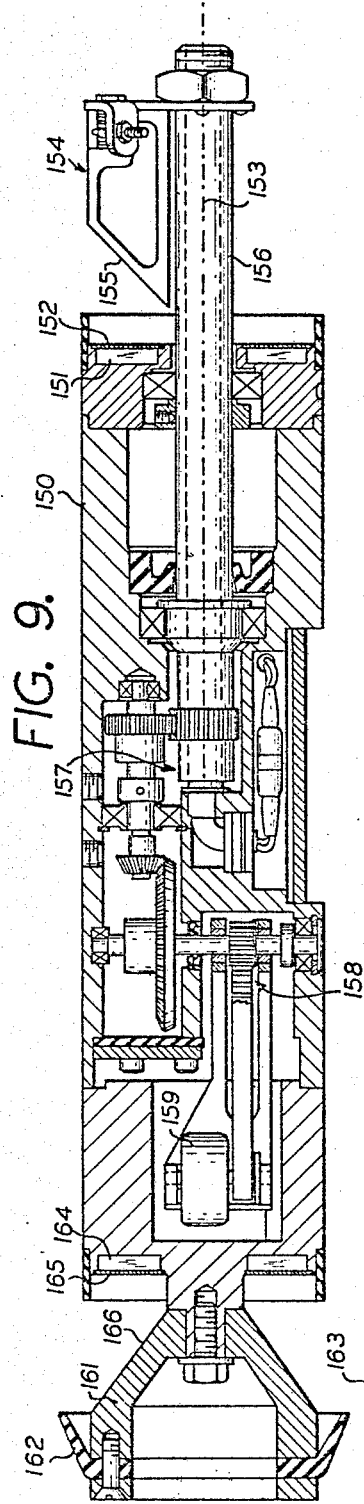
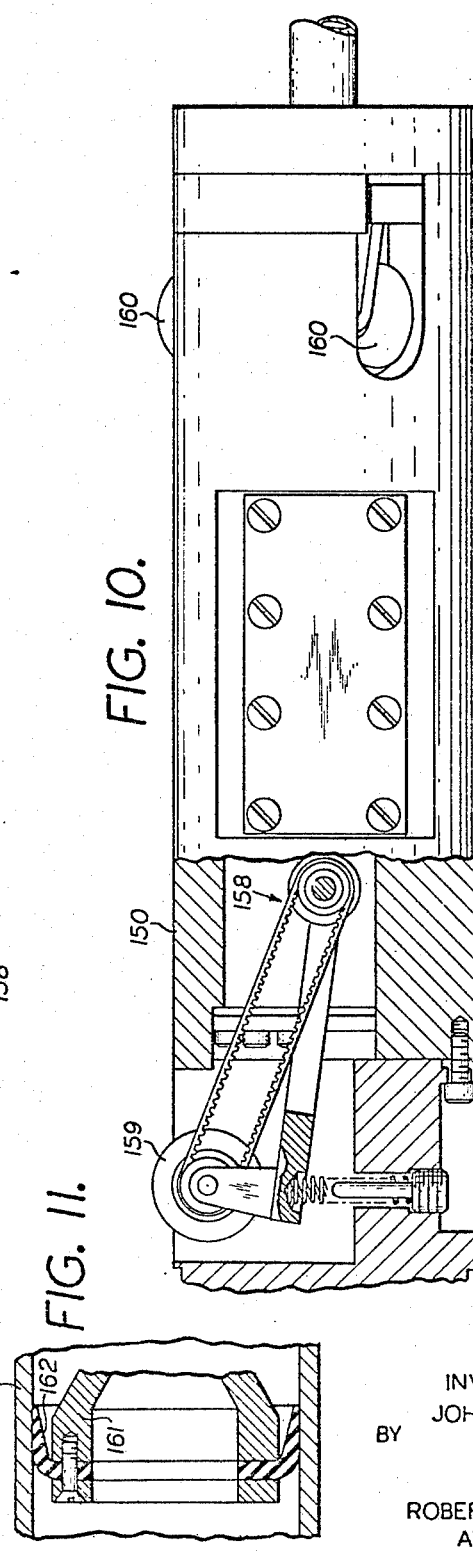
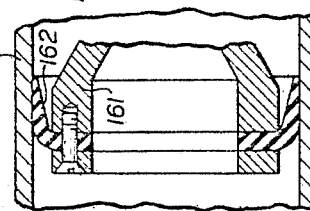
INVENTOR
JOHN V. COWAN
BY
ROBERT HOCKFIELD
ATTORNEY.

United States Patent Office 3,121,324
Patented Feb. 18, 1964

3,121,324
ULTRASONIC INSPECTION APPARATUS
John V. Cowan, Danbury, Conn., assignor, by mesne assignments, to Automation Industries, Inc., El Segundo, Calif., a corporation of California
Filed Jan. 11, 1961, Ser. No. 82,065
20 Claims. (Cl. 73—67.5)

This invention relates to ultrasonic inspection apparatus and more particularly pertains to a new and improved object-scanning system for such apparatus.

In ultrasonic inspection an electro-mechanical transducer is acoustically coupled to an object under test and is energized with pulses of ultrasonic energy so that wave energy is propagated into the object. Reflections from discontinuities or defects cause pulses of ultrasonic wave energy to return to the transducer and these are converted to electrical pulse signals which are supplied to an appropriate indicator. As is well known, the timing of returning pulses with respect to the emitted pulses indicates the distance to the discontinuities or defects. In order to explore the entirety of an object under test, the transducer and the object are moved relative to one another. However, the size and/or configuration of the test object may make exploration of the test object difficult.

It is, therefore, an object of the present invention to provide new and improved object-scanning systems for ultrasonic inspection apparatus. Another object of the present invention is to provide new and improved object-scanning systems for ultrasonic inspection apparatus which does not require relative movement between the transducer and the object under test for a particular mode of scanning action.

A further object of the present invention is to provide new and improved object-scanning systems for ultrasonic inspection apparatus especially adapted for the exploration of elongated test objects.

Still another object of the present invention is to provide new and improved object-scanning systems for ultrasonic inspection apparatus which are relatively simple to construct and yet entirely efficient and reliable in operation.

An object-scanning system for ultrasonic inspection apparatus in accordance with the present invention comprises a transducer having an ultrasonic-wave-emitting surface of annular configuration and reflector means including an ultrasonic-wave-reflecting surface operatively disposed relative to the ultrasonic-wave-emitting surface in spaced, non-paralleled relation thereto and supported for movement along the path substantially co-extensive with the ultra-sonic wave-emitting surface. The system further comprises means for displacing the reflector along the aforesaid path thereby effectively to scan a path along an object under inspection.

In accordance with the particular embodiment of the invention, the transducer and the reflector means have aligned openings for receiving the object under inspection.

In another embodiment of the invention, the object-scanning system comprises a pair of transducers disposed with their ultrasonic-wave-emitting surfaces extending about a common axis substantially perpendicular thereto. The reflector means includes a pair of ultrasonic-wave-reflecting surfaces each operatively disposed relative to one of the ultrasonic-wave-emitting surfaces and positioned opposite to one another with the common axis for the emitting surfaces therebetween.

A further embodiment of the invention includes reflector means in which two ultrasonic-wave-reflecting surfaces are operatively disposed in spaced, non-paralleled relation to the ultrasonic-wave-emitting surface of a transducer. The reflecting surfaces are disposed opposite to one another with the axis about which they are movable therebetween.

In another embodiment of the invention, a pair of transducers have their ultrasonic-wave-emitting surfaces spaced from and facing one another. The reflector means includes a pair of ultrasonic-wave-reflecting surfaces each operatively disposed relative to one of the ultrasonic-wave-emitting surfaces and orientated at different angles relative to the corresponding ultrasonic-wave-emitting surface. By displacing the reflector means about an annular path, two paths along an object under inspection are scanned.

In a further embodiment of the invention, the transducer is adapted to be positioned within an opening of an object under inspection and the reflector means is displaced about an axis within the object.

The reflector means in any of the various embodiments of the invention may be comprised of a single ultrasonic-wave-reflecting surface or it may be comprised of first, second and third ultrasonic-wave-reflecting surfaces operatively arranged so that ultrasonic-wave-energy from the transducer is reflected by the reflecting surfaces in their named order and toward the object under inspection.

The novel features of the present invention are set forth with particularity in the appended claims. The present invention, both as to its organization and manner of operation, together with further objects and advantages thereof, may best be understood by reference to the following description taken into connection with the accompanying drawings in which:

FIG. 4 is a view in partial longitudinal cross-section of an object-scanning system for ultrasonic inspection apparatus constructed in accordance with another embodiment of the present invention;

FIG. 9 is a view in longitudinal cross-section of an object-scanning system for ultrasonic inspection apparatus featuring still another embodiment of the present invention;

FIG. 10 is another view of a portion of the apparatus of FIG. 9, shown partially in longitudinal cross-section, and illustrating the disposition of an outer housing for the apparatus; and FIG. 11 is a representation of a portion of the apparatus of FIG. 9 shown in operative position within an object under inspection.

Figure 1:
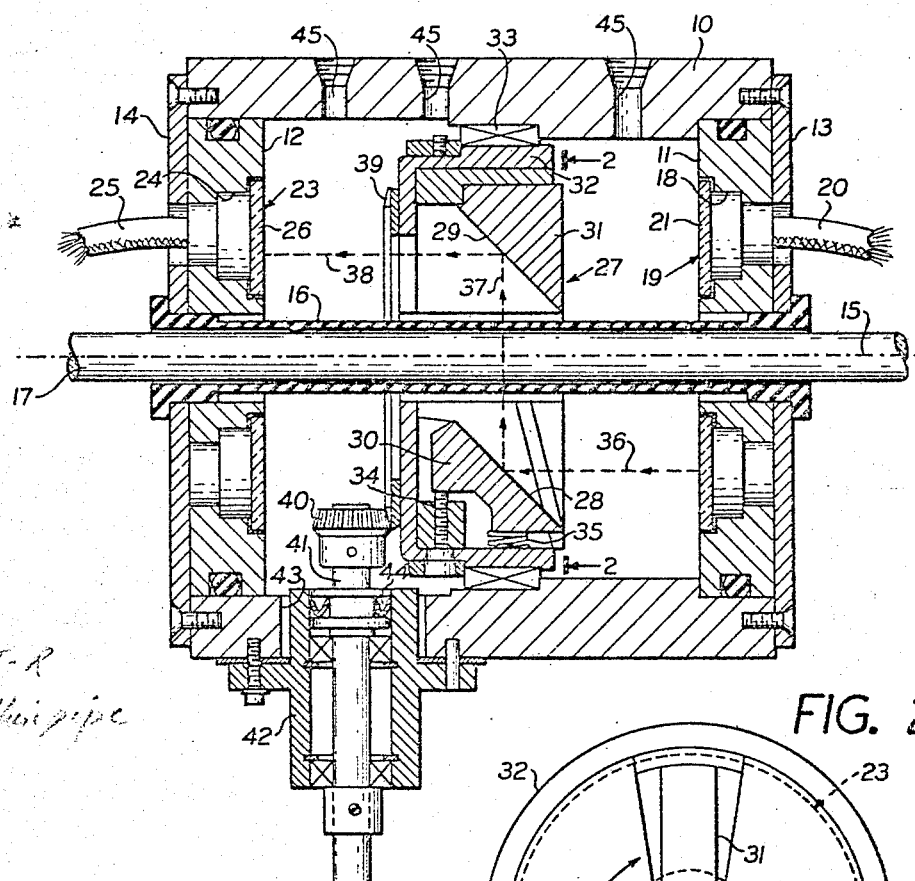
FIG. 1 is a view in longitudinal cross-section of an object-scanning system for ultrasonic inspection apparatus constructed in accordance with the present invention.

As shown in FIG. 1 of the drawings, apparatus constructed in accordance with the present invention includes a housing having an outer shell 10 fluidly sealed by end closures 11 and 12 which are held in place by end plates 13 and 14. Central openings in members 11–14 are aligned along a common axis 15 and a tubular seal 16 extends through these openings to maintain the fluid integrity of the housing. The interior diameter of tube 16 is such that an elongated object, such as the cylindrical bar 17 illustrated in FIG. 1, may be conveniently passed through for inspection.

In an annular seat 18 provided in the interior surface of closure 11, a first transducer 19 of annular configuration is supported. An electric cable 20 for the transducer extends through closure 11 and end plate 13 so that appropriate electrical connections can be made to the transducer. The transducer has an ultrasonic-wave-emitting surface 21 of annular configuration disposed in a plane which is perpendicular to common axis 15. Another transducer 23 is supported within an annular seat 24 in the interior surface of closure 12, and its electrical cable 25 extends through end plate 14. Ultrasonic-wave-emitting surface 26 of transducer 23 lies in a plane perpendicular to axis 15 and faces surface 21 of transducer 19. The transducers 19 and 23 may be constructed of piezo-electric crystals of any known composition.

Figure 2:
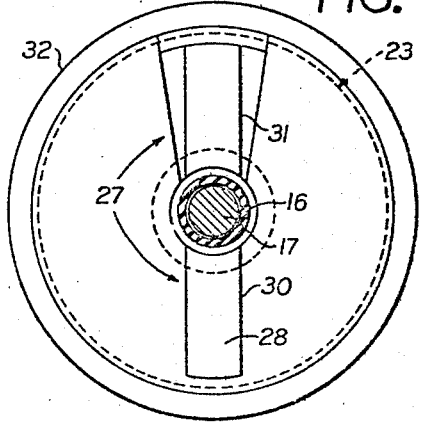
FIG. 2 is a cross-sectional view taken along lines 2—2 of FIG. 1.

The apparatus further comprises reflector means 27 disposed between the transducers 19 and 23. The reflector means 27 includes a first, ultrasonic-wave-reflecting surface 28 operatively disposed relative to ultrasonic-wave-reflecting surface 21 of transducer 19 in spaced, non-parallel relation thereto. Surface 28 is relatively narrow compared to the annular extent of transducer surface 21, as may be seen in FIG. 2, and as will be described more particularly hereinafter, it is supported for movement along a path substantially coextensive with surface 21. Reflector means 27 further includes a second, ultrasonic-wave-reflecting surface 29 operatively disposed relative to ultrasonic-wave-emitting surface 26 of transducer 23 in spaced, non-paralleled relation thereto. It is similar and parallel to surface 28 and it is supported for movement along a path substantially coextensive with surface 26 in a manner to be described more fully hereinafter. Surfaces 28 and 29 are formed on blocks 30 and 31 of a suitable material whose selection is within the province of one skilled in the art. These blocks are mounted in a cylindrical carriage 32 which is supported for free rotation within cylindrical housing 10 by means of conventional bearings 33.

The ultrasonic-wave-reflecting surfaces 28 and 29 define respective, acute angles relative to axis 15 and are positioned opposite to one another with the axis therebetween. Both of the blocks 30 and 31 may be fixed, or one of them may be adjustable, as illustrated. Thus, by means of an adjusting screw 34 and a spring 35, and an appropriate pivotable connection (not shown) the block 30 may be pivoted about an axis perpendicular to the plane of the sheet of FIG. 1 thereby varying the angle defined by surface 28 and axis 15. In general, the block 30 is adjustably fixed so that ultrasonic wave energy emitted by transducer 19 along the path represented by a broken line 36 parallel to axis 15 is reflected transversely to the axis so as to propagate along a path 37 and after striking surface 29, ultrasonic wave energy is propagated along a path 38 extending parallel to axis 15 and intercepting surface 26 of transducer 23.

To displace reflector means 27 so that the ultrasonic-wave-reflecting surfaces rotate about the paths described above, a ring gear 39 is fixed to carriage 32 and is in meshing engagement with a driving gear 40 that is fixed to one end of a shaft 41. The shaft 41 extends through a bushing 42 which passes through and is sealed to an opening 43 in cylindrical housing 10. A suitable fluid seal 44 between the shaft 41 and the inner wall of bushing 42 provides a fluid-type seal while permitting rotational movement of the shaft. An appropriate driving motor (not shown) may be connected to the end portion of shaft 41 outside of housing 10.

Suitable openings in the upper portion of housing wall 10 such as the ones designated by numeral 45 are provided so that an appropriate liquid couplant may be introduced. The couplant such as water or mineral oil, provides a conducting path for ultrasonic wave energy in a manner known to those skilled in the art.

Electrical cables 20 and 25 extend to the electrical circuit portion (not shown) of ultrasonic inspection apparatus which may be of conventional construction. For example, apparatus of the type disclosed in Patent No. 2,507,854 may be employed to generate pulses of electrical energy which are supplied to transducer 19. An appropriate amplifier is connected to transducer 23 and an indicator is coupled to the amplifier. Since the electrical apparatus for performing these functions is conventional and does not form a part of the present invention, a detailed description herein is deemed unnecessary.

In operation, ultrasonic signal energy is supplied to transducer 19 via the conductors of cable 20 and the signal energy is converted to ultrasonic wave energy which propagates from surface 21 in a generally cylindrical pattern. Ultrasonic-wave-reflecting surface 28 has a relatively limited surface area as may be seen in FIG. 2 so that only a portion of the ultrasonic-wave energy intercepts the surface. In other words, its extent along a path parallel to the path of ultrasonic-wave-emitting surface 21 is relatively small so that energy reflected along a path such as the path 37 is confined to the body of test object 22. Such energy after traversing the test object is reflected by ultrasonic-wave-reflecting surface 29 along path 38 toward ultrasonic-wave-emitting surface 26 of transducer 23.

It is evident that any flaws or discontinuities in test object 22 will affect ultrasonic wave energy transmitted through the test object and indications are obtained in a known manner. By rotating shaft 41 the reflector means 27 is rotated about axis 15 and thus the ultrasonic-wave-reflecting surfaces 28 and 29 travel along paths that effectively scan the object 17. At the same time, test object 17 is passed through tube 16 at a rate slower than the scanning rate. In this way continuous testing of the object is achieved.

It is evident that because the test object need not be rotated, scanning is readily achieved without the need of unduly complicated handling equipment. Further, since the transducers 19 and 23 need not be rotated, the object-scanning system embodying the present invention is relatively simple and inexpensive to construct and yet is entirely efficient and reliable in operation. Accordingly, it is obvious that the new and improved object-scanning system for ultrasonic inspection apparatus featuring the present invention is especially adapted for the exploration of an elongated test object which may be inspected with speed and facility.

If desired, tube 16 may be provided with a number of very small openings to permit the leakage of fluid couplant from within the housing 10 into the annulus between tube 16 and the test object 17. Of course, an appropriate supply of couplant may be continued through one of the openings 45. In this way, an ultrasonic-wave-couplant path between the test object 17 and the ultrasonic-wave-reflecting surfaces 28 and 29 may be maintained. Of course, tube 16 is constructed of a material which is substantially transparent to ultrasonic-wave-energy. For example, elastomers such as gum rubber, butyl gum rubber, or urethane rubber may be used.

Figure 3:
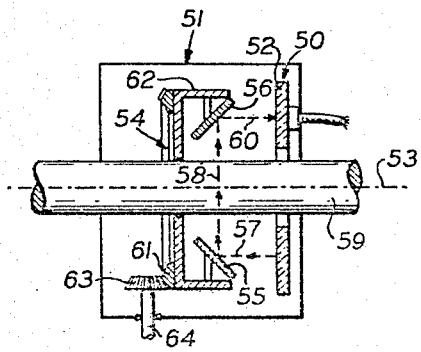
FIG. 3 is a simplified view in longitudinal cross-section of a modification which may be made to the embodiment of FIGS. 1 and 2.

In the embodiment of the invention illustrated in FIG. 3 an annular transducer 50 is supported within a housing 51 and its ultrasonic-wave-emitting surface 52 extends about an axis 53 which is perpendicular to the plane of surface 52. Reflector means 54 includes first and second ultrasonic-wave-reflecting surfaces 55 and 56 disposed on opposite sides of axis 53 and orientated so that ultrasonic-wave energy emitted from surface 52 along path 57 parallel to axis 53 is reflected along path 58 which is perpendicular to axis 53. After traversing test object 59 ultrasonic-wave energy is reflected by ultrasonic-wave-reflecting surface 56 along path 60 and thus returned to transducer 50. In this way, a single transducer may be employed both for the transmission and reception of ultrasonic-wave energy.

A ring gear 61 attached to a carriage 62 for the reflector means 54 is in meshing engagement with a driving gear 63 coupled to a shaft 64. The shaft is coupled to a driving motor (not shown).

In operation, pulses of ultrasonic-wave energy are emitted in a circular pattern from face 52 of transducer 50. A segment of such energy is reflected by reflecting surface 55 so that energy traverses the test object 59 and by means of reflecting surface 56 some of the energy is returned to transducer 50. Rotation of shaft 64 produces rotation of carriage 62 and of reflector means 54 thereby scanning an annular path about test object 59. If desired, reflector 56 may be omitted and reflections from test object 59 are returned along paths 58 and 57 to the transducer 50.

In the embodiment of the invention illustrated in FIG. 4, a cylindrical housing 70 includes end closures 71 and 72 on which annular transducers 73 and 74 are supported interiorally of the housing. Ultrasonic-wave-emitting surfaces 75 and 76 of the transducers 73 and 74 face toward one another and lie in planes which are perpendicular to an axis 77 about which these surfaces extend. A carriage 78 is supported between the transducers 73 and 74 for rotation about axis 77 and annular supports 79 and 80 are mounted to opposite ends of the carriage 78. These supports are constructed of a material which is absorbent to ultrasonic wave energy and each is provided with a recess for receiving individual members 81 and 82 which have respective surfaces 83 and 84 that reflect ultrasonic wave energy. The reflecting surfaces 83 and 84 are inclined at different, acute angles relative to axis 77 so that ultrasonic wave energy from the transducers 73 and 74 is reflected at different angles into a test object 85 which extends along axis 77 through openings 86, 87 and 88 in end closure 71, carriage 78 and end closure 72, respectively.

An electric cable 89 provides the means for coupling transducer 73 to appropriate electronic equipment (not shown) and similarly, an electric cable 90 is employed to couple transducer 74 to electronic equipment (not shown). In each case, the equipment may be of conventional construction, for example, such as disclosed in Patent No. 2,507,854.

A driving motor 91 is mounted to the exterior of housing 70 and its shaft 92 is coupled by means of a belt 93 to carriage 78 so as to rotate reflector means 83, 84 about axis 77.

In operation, pulses of ultrasonic wave energy are emitted in a cylindrical beam from each of transducers 73 and 74 and a portion of each of these beams is reflected toward the test object 85 by the corresponding one of reflector surfaces 83 and 84. This is illustrated by means of broken lines 94 and 95 associated with transducer 73 and broken lines 96 and 97 associated with transducer 74. Reflections from defects or discontinuities return along these lines and each transducer converts such ultrasonic wave energy into electrical signals which are supplied to the electrical apparatus. Thus, indications of discontinuities or defects are obtained.

Motor 91 produces rotation of carriage 78 and thereby rotating reflector means 83, 84 and ultrasonic wave energy from each transducer is caused to scan an annular path about test object 85. Test object 85 may be moved along axis 77 at a rate slower than the scanning rate so that continuous inspection may be achieved.

Figure 5:
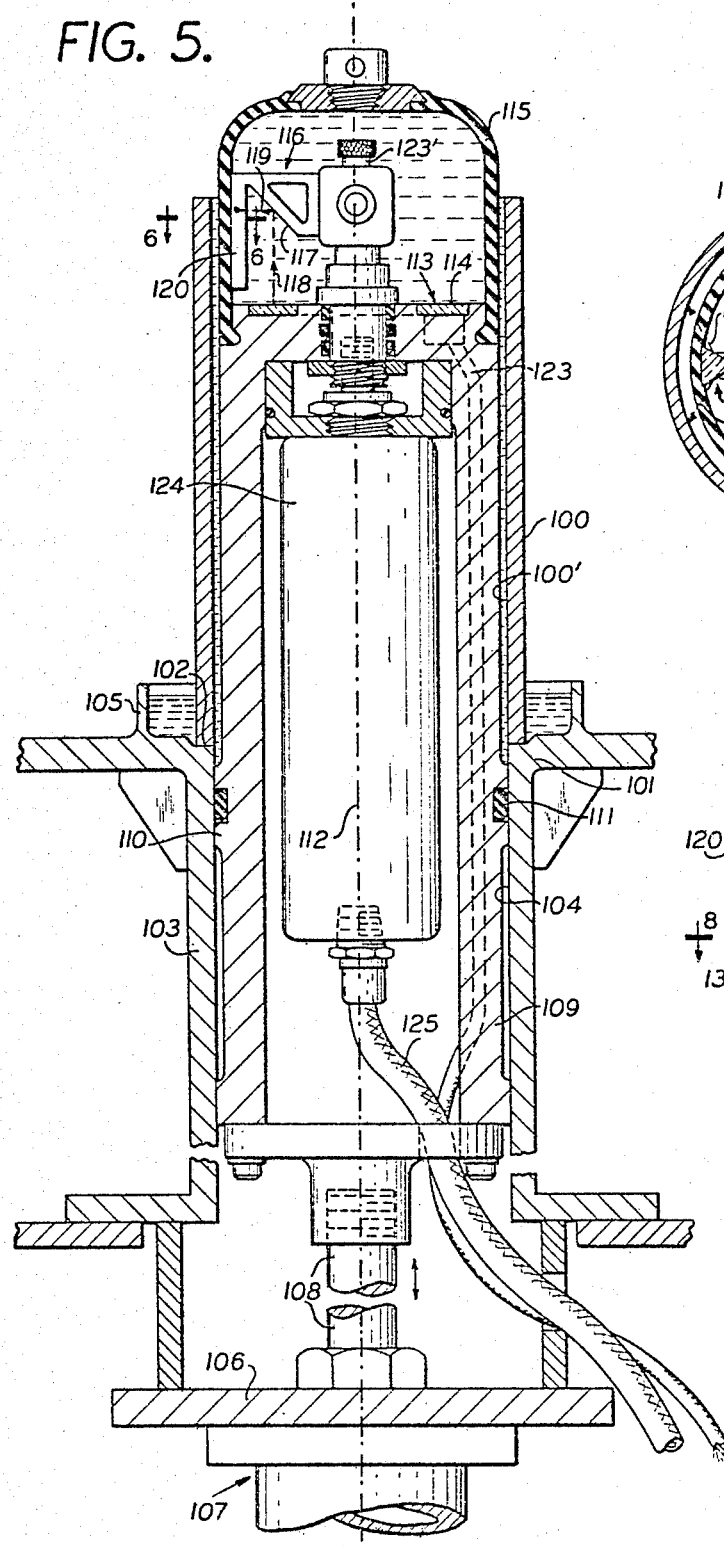
FIG. 5 is a view in longitudinal cross-section of an object-scanning system for ultrasonic inspection apparatus constructed in accordance with a further embodiment of the present invention.

In the several embodiments of the invention thus far described, the object under inspection is illuminated with ultrasonic wave energy incident upon an external surface. In other words, the object is scanned about its outer surface. Apparatus embodying the present invention may also be employed to scan an inner surface of a test object. Thus, as shown in FIG. 5 a hollow, cylindrical test object 100 is associated with a fixture 101. Fixture 101 includes a table having an annular seating surface 102 on which the lower end of cylinder 100 rests. Depending from table 102 is a cylindrical extension 103 having an internal bore 104 of substantially the same diameter as the inner surface 100' of test object 100. A shallow, cylindrical container 105 extends upwardly from table 102 and has a diameter appreciably larger than the outer diameter of test object 100.

Fixed to the lower end of cylindrical extension 103 is a frame 106 which supports a hydraulic actuator 107 having an actuator rod 108. The rod extends upwardly and is fixed to the lower end of a cylindrical carriage 109 whose outer diameter is smaller than the inner diameter of cylindrical surfaces 101' and 104. A sealing flange 110 extends from cylinder 109 and is fluidly sealed by means of an O ring 111 to bore 104 and to surface 100'; however, longitudinal movement of the carriage 109 in the direction of axis 112 is permitted.

Figure 6:
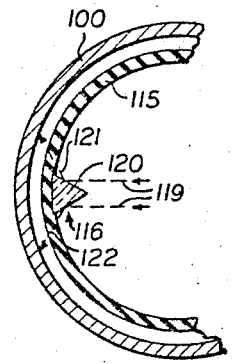
FIG. 6 is a cross-sectional view taken along lines 6—6 of FIG. 5.

In the vicinity of the upper end of carriage 109 a transducer 113 of annular configuration is supported with its ultrasonic-wave-emitting surface 114 facing in an upward direction. The space above the transducer 114 is closed by a dome-shaped cap 115. Within the space enclosed by cap 115 reflector means 116 is supported for movement about axis 112. Reflector means 116 has a first ultrasonic-wave-reflecting surface 117 positioned at an angle relative to axis 112 and of relatively limited extent as compared to the annular extent of surface 114 of transducer 113. Surface 117 reflects ultrasonic wave energy propagated in the direction of broken line 118 and redirects it in the direction of broken line 119 toward a pair of ultrasonic-wave-reflecting surfaces 120 which effectively split the beam traveling in direction 119 into component parts 121 and 122 as shown in FIG. 6. Thus, ultrasonic wave energy is propagated through the wall of cap 115 and into test object 100. An electric cable 123 is employed to complete electrical connections between the transducer 113 and electrical equipment of the type described earlier for supplying signal energy to the transducer which is thereby converted into ultrasonic wave energy. Reflections of defects or discontinuities within test object 100 return along the paths 121, 122, 119 and 118 and such ultrasonic wave energy is converted to electrical signals which are supplied to the electrical equipment. Thus, indications of defects are provided in the manner described hereinbefore.

In order to effect scanning of the test object 100, the reflector means 116 is fixed to one end of a shaft 123' which extends through the opening in transducer 113 and is coupled to a driving motor 124 supported within carriage 109. An electric cable 125 is employed to energize the motor so that reflector means 116 may be rotated about a path that is coextensive with and parallel to surface 114 of transducer 113. It is evident that by employing an ultrasonic-wave-reflecting surface 117 operatively associated with transducer 113 in non-parallel relation thereto, scanning of the test object 100 may be effected about an annular path along the inner surface thereof.

In operation, carriage 109 is positioned below the level of table 102 and test object 100 is placed upon the table with its inner bore 100' aligned with bore 104. Container 105 is filled with an appropriate couplant, such as water or mineral oil (the space enclosed by cap 115 is also filled with the couplant) and actuator 107 drives rod 108 upwardly. With motor 124 rotating reflector means 116 and the electrical equipment (not shown) operatively connected to electrical cable 123, scanning about the inner surface of test object 100 occurs as the carriage 109 is moved upwardly. Fluid from container 105 is brought into the annulus between cap 115 and test object 100 so that a fluid coupling path for ultrasonic wave energy is maintained while the carriage moves upwardly. In this way the test object is scanned during upward movement of the carriage. Scanning likewise occurs during downward movement and when the cap 115 reaches a position below table 102 the test object 100 may be removed.

Figure 7:
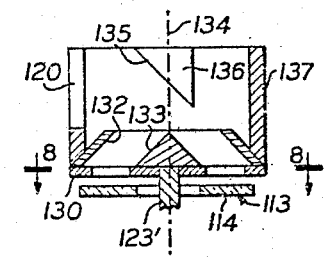
FIG. 7 is a view in longitudinal cross-section of a modification which may be made to a portion of the apparatus of FIGS. 5 and 6.
Figure 8:
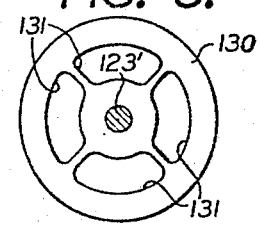
FIG. 8 is a cross-sectional view taken along line 8—8 of FIG. 7.

In FIGS. 7 and 8 is shown a modification which may be made to the reflector means of the embodiment illustrated in FIGS. 5 and 6. The modified reflector means includes a disc-shaped portion 130 fixed to the upper end of shaft 123'. A plurality of openings or windows 131 in member 130 are in registry with ultrasonic-wave-emitting surface 113 of transducer 114 and thus ultrasonic wave energy may pass from the transducer and strike an ultrasonic-wave-reflecting surface 132 of generally frusto-conical configuration. As can be seen in the representation of FIG. 7 surface 132 is operatively disposed in non-parallel relation to surface 113. Essentially all of the ultrasonic wave energy reflected by surface 132 impinges upon another ultrasonic-wave-reflecting surface 133 of conical configuration having its apex lying on a longitudinal axis 134 for the assembly and for shaft 123'. Surface 133 is generally parallel with surface 132 and thus ultrasonic-wave-energy is reflected in an upwardly direction. A relatively small ultrasonic-wave-reflecting surface 135 intercepts some of the energy and reflects it in a direction perpendicular to the axis 134. Surface 135 is included in a member 136 supported by a structure 137 that extends upwardly from the outer periphery of member 130. If desired, an ultrasonic-wave-reflecting surface 120, similar to the one illustrated in FIGS. 5 and 6 may also be employed.

It is evident that by rotating shaft 123' a test object may be scanned about its inner surface with ultrasonic wave energy.

In the embodiment of the invention shown in FIGS. 9–11, scanning of the interior surface of an object is also featured. Supported at the right-hand end of a carriage 150 is a generally annular transducer 151 having an annular ultrasonic-wave-emitting surface 152 disposed perpendicularly to an axis 153. This embodiment also includes reflector means 154 provided with an ultrasonic-wave-reflecting surface 155 operatively related to emitting surface 152 in non-parallel relation thereto. The reflector means 154 is fixed to one end of a shaft 156 which extends through the central opening in transducer 155. The other end of shaft 156 is coupled via a gear train 157 and a belt drive 158 to a friction wheel 159 which is arranged to engage the inner surface of an object under inspection. As shown in FIG. 10, conventional idler wheels 160 are provided so as to orient the apparatus within an object under inspection, such as a long pipe. Movement of the apparatus in the direction of axis 153 through the pipe causes rotation of friction wheel 159 which, in turn, produces rotation of shaft 156 and of reflector 154. Thus, scanning of the object under inspection is accomplished.

In order to displace the apparatus through a pipe, a support 161 at the left-hand end of carriage 150 is sealed to a flexible cup 162 which, as shown in FIG. 11, is distorted when inserted in the pipe 163 so as to provide a fluid seal to the inner wall of the pipe. Since the cup shaped member 162 is sealed to support 161, a pressure differential on the left and right hand sides of the cup will produce a force that drives the equipment through the pipe 163. In other words, a liquid, such as water may be introduced on the right hand side of cup 162 and with appropriate pressure thereof movement of the apparatus will occur in a left-hand direction.

Another annular transducer 164 is positioned in the vicinity of support 161 with its ultrasonic-wave-emitting surface 165 facing a generally frusto-conical surface 166 of member 161. Surface 166 provides an ultrasonic-wave-reflecting surface and is disposed in non-parallel relation to emitting surface 165. Accordingly, ultrasonic wave energy which is emitted in a generally cylindrical beam is reflected by surface 166 radially toward the inner wall of the pipe 163 (FIG. 11). Thus, in addition to the scanning produced by means of transducer 151 and reflector means 154, inspection by means of ultrasonic wave energy occurs by means of transducer 164 and reflector surface 166.

In the embodiments of the invention illustrated in FIGS. 1–4, ultrasonic wave energy may be reflected from within the housing or containers and such reflections may produce indications. By appropriately spacing the end walls, indications can be made to occur outside the viewing range on the indicator in which indications from within the test object are anticipated. However, if desired the oppoiste end walls may be coated with a sound-absorbing material so as to eliminate reflections. Alternatively, suitable time-gating may be provided in a manner described in the above-mentioned Patent No. 2,507,854 so that indications from the walls of the container are not presented.

From the foregoing description, it may be seen that through the use of object scanning systems embodying the present invention, test objects may be explored in a highly convenient manner. Thus, in applications to test objects that are extremely long or otherwise of a configuration so as to make rotation prohibitive, inspection can be afforded with speed and facility. Moreover, since the transducers need not be displaced, complexities which might occur because of the electrical cables are avoided.

It is to be understood that where reference is made to a transducer in its function of the conversion of electric energy to wave energy, the theorem of reciprocity applies, and the transducer function of converting wave energy to electrical energy may also be applicable.

While particular embodiments of the present invention have been shown and described, it is obvious that changes and modifications may be made without departing from this invention in its broader aspects and therefore, the aim in the appended claims is to cover all such changes and modifications as fall within the true spirit and scope of this invention.

Having described my invention, what I claim and desire to secure by Letters Patent is:

1. An object-scanning system for ultrasonic inspection apparatus comprising: a transducer having an ultrasonic wave-emitting surface of annular configuration; reflector means including an ultrasonic-wave-reflecting surface operatively disposed in the ultrasonic beam from said ultrasonic-wave-emitting surface in spaced, non-parallel relation thereto and supported for movement along a path substantially coextensive with said ultrasonic-wave-emitting surface and perpendicular to the direction of said beam; and means for displacing said reflector means along said path thereby effectively to scan a path along an object under inspection.

2. An object-scanning system for ultrasonic inspection apparatus comprising: a transducer having an ultrasonic-wave-emitting surface of annular configuration; reflector means including an ultrasonic-wave-reflecting surface operatively disposed in the ultrasonic beam from said ultrasonic-wave-emitting surface in spaced, non-parallel relation thereto and supported for movement along an annular path substantially coaxially oriented with respect to said ultrasonic-wave-emitting surface of said transducer; and means for displacing said reflector means along said path thereby effectively to scan a path along an object under inspection.

3. An object-scanning system for ultrasonic inspection apparatus comprising: a transducer having an ultrasonic-wave-emitting surface of annular configuration defining a circle having a given center; reflector means including an ultrasonic-wave-reflecting surface operatively disposed in the ultrasonic beam from said ultrasonic-wave-emitting surface in spaced, non-parallel relation thereto and supported for movement along an annular path defining another circle lying in a plane parallel to the plane of said first-mentioned circle and having a center intercepted by a line passing through said given center and normal to said plane; and means for displacing said reflector means along said path thereby effectively to scan a path along an object under inspection.

4. An object-scanning system for ultrasonic inspection apparatus comprising: a transducer having an ultrasonic-wave-emitting surface of annular configuration; reflector means including an ultrasonic-wave-reflecting surface having a surface area smaller than the area of said ultrasonic-wave-emitting surface, said reflector means being disposed with said ultrasonic-wave-reflecting surface in the ultrasonic beam from said ultrasonic-wave-emitting surface in spaced, non-parallel relation thereto and said reflector means being supported for movement along a path substantially coextensive with said ultrasonic-wave-emitting surface and perpendicular to the direction of said beam; and means for displacing said reflector means along said path thereby effectively to scan a path along an object under inspection.

5. An object-scanning system for ultrasonic inspection apparatus comprising: a transducer having an ultrasonic-wave-emitting surface of annular configuration extending about an axis substantially perpendicular to the surface thereof; reflector means supported for movement about said axis along a path substantially coextensive with said ultrasonic-wave-emitting surface, said reflector means including an ultrasonic-wave-reflecting surface in the ultrasonic beam from said emitting surface operatively disposed in spaced, non-parallel relation to said ultrasonic-wave-emitting surface of said transducer and defining an acute angle relative to said axis to reflect said beam into an object under inspection; and means for displacing said reflector means along said path and perpendicular to the direction of said beam thereby effectively to scan a path along said object.

6. A system according to claim 5 wherein said transducer and said reflector means have aligned openings for receiving the object under inspection.

7. A system according to claim 5 wherein said transducer and said reflector means have aligned openings on said common axis, and further comprising a housing enclosing said transducer and said reflector means, said housing including a tubular portion extending through said openings of said transducer and said reflector means and adapted to receive the object under inspection.

8. An object-scanning system for ultrasonic inspection apparatus comprising: a pair of transducers each having an ultrasonic-wave-emitting surface of annular configuration and supported opposite to one another; reflector means including a pair of ultrasonic-wave-reflecting surfaces each operatively disposed in the ultrasonic beam from one of said ultrasonic-wave-emitting surfaces in spaced, non-parallel relation thereto to reflect said beam into an object under inspection and supported for simultaneous movement along a circular path surrounding said object, substantially coextensive with said wave-emitting surface and perpendicular to the direction of said beam; and common drive means for displacing both of said reflector means so that said ultrasonic-wave-reflecting surfaces travel along said paths thereby effectively to scan said object.

9. A system according to claim 8 wherein said ultrasonic-wave-emitting surfaces extend about a common axis substantially perpendicular thereto and wherein said ultrasonic-wave-reflecting surfaces define respective, acute angles relative to said axis, and are positioned opposite to one another with said axis therebetween.

10. A system according to claim 5 wherein said reflector means further includes another ultrasonic-wave-reflecting surface in the ultrasonic beam from said emitting surface operatively disposed in spaced, non-parallel relation to said ultrasonic-wave-emitting surface of said transducer and disposed opposite to said first-mentioned ultrasonic-wave-reflecting surface with said axis therebetween.

11. An object-scanning system for ultrasonic inspection apparatus comprising: a pair of transducers each having an ultrasonic-wave-emitting surface of annular configuration spaced from and facing one another; reflector means disposed between said transducers and including a pair of ultrasonic-wave-reflecting surfaces each operatively disposed in the ultrasonic beam from a different one of said ultrasonic-wave-emitting surfaces in spaced, non-parallel relation thereto, said ultrasonic-wave-reflecting surfaces being oriented at different angles relative to the corresponding ultrasonic-wave-emitting surfaces to reflect each of said beams into an object under inspection, said reflector means being supported for movement along an annular path; and means for displacing said reflector means along said path thereby effectively to scan two paths along said object.

12. An object-scanning system for ultrasonic inspection apparatus comprising: a transducer having an ultrasonic-wave-emitting surface of annular configuration and adapted to be positioned within an opening of an object under inspection; reflector means including an ultrasonic-wave-reflecting surface in the ultrasonic beam from said emitting surface operatively disposed relative to said ultrasonic-wave-emitting surface in spaced, non-parallel relation thereto and supported for movement about an axis within the object along a path substantially coextensive with said ultrasonic-wave-emitting surface, said ultrasonic-wave-emitting surface, said ultrasonic-wave-reflecting surface facing away from said axis; and means for displacing said reflector means along said path thereby effectively to scan a path along an object under inspection.

13. A system according to claim 12 further comprising means for displacing said transducer and said reflector means simultaneously relative to the object under inspection in the direction of said axis.

14. A system according to claim 12 wherein said reflector means includes another ultrasonic-wave-reflecting surface in the ultrasonic beam from said emitting surface operatively disposed relative to said first-mentioned ultrasonic-wave-reflecting surface in spaced, non-parallel relation thereto and movable therewith about said axis, each of said reflecting surfaces being positioned to reflect a different portion of said beam along different paths into said object.

15. An object-scanning system for ultrasonic inspection apparatus comprising: a transducer having an ultrasonic-wave-emitting surface of annular configuration; reflector means including first, second and third ultrasonic-wave-reflecting surfaces, said first ultrasonic-wave-reflecting surface being operatively disposed in the ultrasonic beam from said ultrasonic-wave-emitting surface in spaced, non-parallel relation thereto and substantially coextensive therewith, said second ultrasonic-wave-reflecting surface being operatively disposed in the ultrasonic beam reflected from said first ultrasonic-wave-reflecting surface in spaced, substantially parallel relation thereto, said third ultrasonic-wave-reflecting surface being operatively disposed in the ultrasonic beam reflected from said second ultrasonic-wave-reflecting surface in spaced non-parallel relation thereto to reflect said beam into an object under inspection and supported for movement along an annular path substantially coaxially oriented with respect to said ultrasonic-wave-emitting surface of said transducer and means for displacing said reflector means along said path thereby effectively to scan a path along said object.

16. A system according to claim 15 wherein said first and said second ultrasonic-wave-reflecting surfaces are of generally conical configuration.

17. An object-scanning system for ultrasonic inspection apparatus comprising: a support adapted to be passed through an opening of an object to be inspected; a transducer carried by said support and having an ultrasonicwave-emitting surface of annular configuration; reflector means carried by said support and including an ultrasonic-wave-reflecting surface operatively disposed in the ultrasonic beam from said ultrasonic-wave-emitting surface in spaced, non-parallel relation thereto to reflect said beam into said object and supported for movement about an axis within the object along an annular path substantially coaxially oriented with respect to said ultrasonic-wave-emitting surface of said transducer; and means for displacing said reflector means along said path thereby effectively to scan a path along an object under inspection.

18. A system according to claim 17 wherein said means for displacing said reflector means includes a wheel adapted to engage the inner surface of said object and thereby rotate in response to relative movement between said support and the object in the direction of said axis, a rotatable shaft extending along said axis and mechanically connected to said reflector means, and a mechanical coupling extending between said wheel and said shaft.

19. An object-scanning system for ultrasonic inspection apparatus comprising: a pair of transducers each having an ultrasonic-wave-emitting surface of annular configuration supported in spaced relation along a given axis with said surfaces facing away from one another; first reflector means including an ultrasonic-wave-reflecting surface operatively disposed in the ultrasonic beam from said ultrasonic-wave-emitting surface of one of said transducers and in spaced, non-parallel relation and substantially coextensive therewith to reflect the beam therefrom into an object under test; second reflector means including an ultrasonic-wave-reflecting surface operatively disposed in the ultrasonic beam from said ultrasonic-wave-emitting surface of the other of said transducers and in spaced, non-parallel relation thereto to reflect the beam therefrom into said object and supported for movement about said axis along an annular path substantially coaxially oriented with respect to said ultrasonic-wave-emitting surface of said other transducer; and means for displacing said second reflector means along said path thereby effectively to scan a path along said object.

20. An object-scanning system for ultrasonic inspection apparatus comprising: a support adapted to be passed through an opening of an object under inspection; a transducer carried by said support and having an ultrasonic-wave-emitting surface of annular configuration; reflector means carried by said support and including an ultrasonic-wave-reflecting surface operatively disposed in the ultrasonic beam from said ultrasonic-wave-emitting surface and in spaced, non-parallel relation thereto to reflect said beam into said object and supported for movement along a path substantially coextensive with said ultrasonic-wave-emitting surface and perpendicular to the direction of said beam; means for displacing said reflector means along said path thereby effectively to scan a path along an object under inspection; and sealing means secured to said support and adapted to provide a fluid seal between said support and the wall of the opening of the object so that a differential in fluid pressure on opposite sides of said sealing means produces movement thereof and of said support through the opening.

References Cited in the file of this patent

UNITED STATES PATENTS

| 2,723,357 | Van Valkenburg et al. | Nov. 8, 1955 |
| 3,028,752 | Bacon | Apr. 10, 1962 |

FOREIGN PATENTS

| 850,478 | Great Britain | Oct. 5, 1960 |